Oct. 3, 1933.  P. S. PALMER  1,928,908
SEED PLANTER
Filed July 9, 1932   2 Sheets-Sheet 1
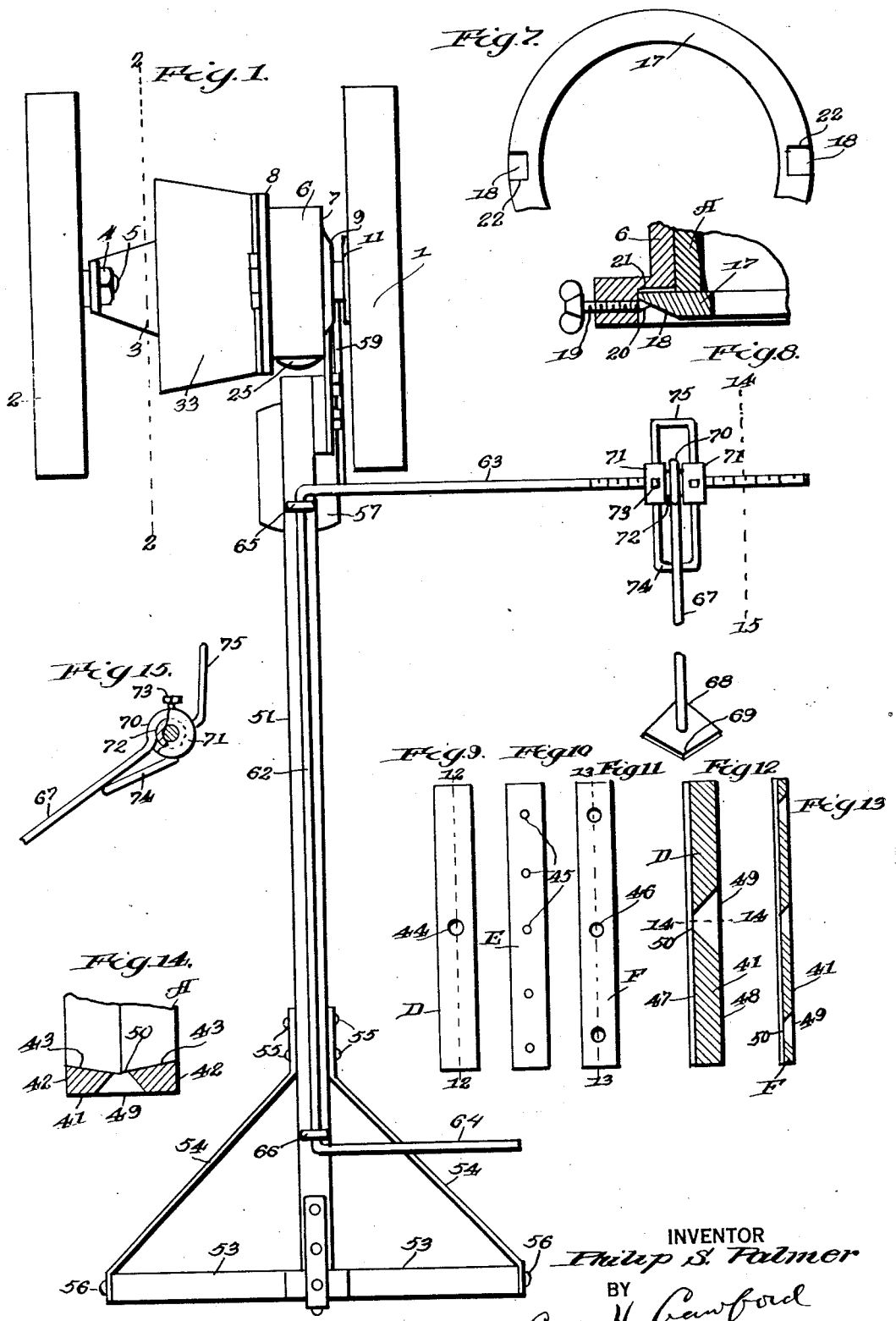
INVENTOR
*Philip S. Palmer*
BY
*Carl H. Crawford*
ATTORNEY Oct. 3, 1933.  P. S. PALMER  1,928,908
SEED PLANTER
Filed July 9, 1932  2 Sheets-Sheet 2
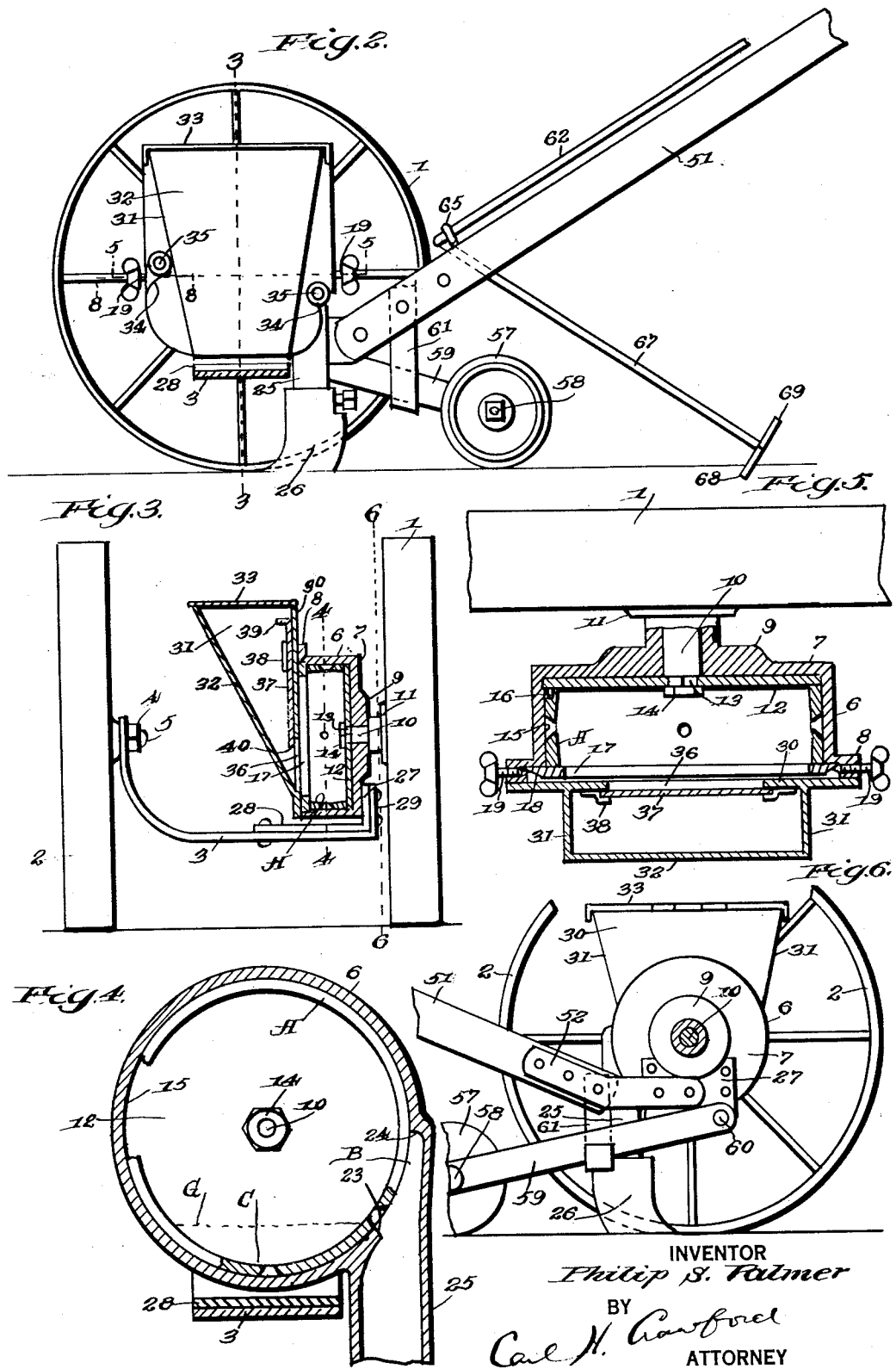
INVENTOR
Philip S. Palmer
BY
Carl H. Crawford
ATTORNEY Patented Oct. 3, 1933

1,928,908

UNITED STATES PATENT OFFICE 1,928,908

SEED PLANTER

Philip S. Palmer, Spokane, Wash., assignor of one-half to George W. Putnam, Spokane, Wash.

Application July 9, 1932. Serial No. 621,660

10 Claims. (Cl. 221—130)

This invention relates to improvements in planters and is addressed to the mechanism, the method, and an article therefor.

The device of this invention relates more particularly to small planters primarily intended for garden truck use such as are propelled or drawn manually, and it is one of the objects of the invention to provide a planter of this type that is equally adapted for drilling seed in rows or dropping seed in hills.

It is an object of the invention to maintain a mass of seed in a free condition for discharge by gravity and to roll and maintain said loose mass of seed in a constant state of motion to prevent packing thereby affording the greatest possible facility for uniform discharge of the seed individually or in predetermined quantities.

A further object is to dispose a loose mass of seed in a position to discharge by gravity when the planter is in operation and being advanced but to prevent loss and waste of seed when the planter is standing idle.

A special feature of the invention is to provide a seed casing adapted to contain the seed to be planted and to equip the same with a ring race whereby any one of a series of seed releasing rings may be selectively inserted into said race in accordance with the character of seed to be planted.

The invention also relates and resides in said seed releasing rings as articles of manufacture, the said rings being of different thickness and having seed releasing apertures of different character to accommodate different kinds of seed.

A special feature of the improved seed releasing rings resides in the latter being provided with seed releasing apertures that are enlarged from the entrance thereof so as to provide reservoirs for a plurality of seeds before the seeds are actually discharged from the casing.

The invention involves novel mechanism adapting the casing for the reception of any of the series of rings and holding each not only in driven engagement but under proper tension.

A further feature of the invention is a novel type of seed feeder which is preferably in the form of a hopper and which not only performs that function, but in addition, the function of closing one side of the seed casing.

The invention also includes a novel form of marker which can be shifted from one side to the other by the user when ending a row, by means readily accessible at the hand grip end of the handle.

The invention has many other features and objects which will be more fully described in connection with the accompanying drawings and which will be more particularly pointed out in and by the appended claims.

In the drawings:—

Fig. 1 is a plan view of the device of my invention showing the marker in one position.

Fig. 2 is a sectional view on line 2—2 of Fig. 1 and looking toward the right of the latter.

Fig. 3 is a sectional view on line 3—3 of Fig. 2, looking toward the left of the latter.

Fig. 4 is an enlarged sectional view on line 4—4 of Fig. 3 with a portion of the seed releasing ring broken away.

Fig. 5 is a sectional view on line 5—5 of Fig. 3.

Fig. 6 is a view in elevation, partly in section, and taken on line 6—6 of Fig. 3, and looking toward the left.

Fig. 7 is a fragmentary view of a portion of the combined retaining and tension ring showing the same in elevation.

Fig. 8 is an enlarged sectional view on line 8—8 of Fig. 2, with the hopper omitted and showing how the tension ring is secured in place.

Fig. 9 is a developed plan view of a seed releasing ring with one aperture and which is adapted for dropping seed in hills.

Fig. 10 is a similar view of a ring with a plurality of spaced apertures adapted for drilling seed in rows.

Fig. 11 is a similar view of another ring having a plurality of large apertures.

Fig. 12 is a sectional view on line 12—12 of Fig. 9 showing how the ring is made relatively thick for large size seed.

Fig. 13 is a sectional view on line 13—13 of Fig. 11, showing a relatively thin ring.

Fig. 14 is a sectional view on line 14—14 of Fig. 12.

Fig. 15 is a sectional view on line 15—15 of Fig. 1.

Like characters of reference designate similar parts throughout the different figures of the drawings.

The improved planter includes ground wheel driving mechanism which in the present embodiment comprises a driving ground or bearing wheel 1 and component parts to be later described. While it is possible to employ a single wheel mechanism, I prefer to use an additional wheel 2, which is solely a supporting ground wheel. A saddle or yoke 3, is bent upwardly and secured by a nut or the like 4, to the axle 5, of wheel 2, so that the yoke 3 is rotatively journalled to said axle, and the latter may be rigidly secured to wheel 2.

A seed containing casing is indicated at 6 and is shown to be of cylindrical form and is disposed in an upright position. Said casing has a side wall 7 disposed adjacent wheel 1, the remaining side of said casing being open, or in other words, that side adjacent wheel 2, is open. The cylindrical wall 6, is suitably provided with an annular or radially projecting flange 8, and the side wall 7, is provided with a thickened portion 9 in which one end of a shaft 10 is rotatively journalled. Said shaft 10, forms an axle for wheel 1, the hub 11 of the latter being secured to said shaft by a set screw or in any desired manner so that when wheel 1 turns, it will drive shaft 10. A ring driving member preferably in the form of a disc 12, is disposed and held against the inside face of wall 7, and is non-rotatively mounted on shaft 10, as by means of a polygonal portion 13 and a nut 14.

The balance of the interior of casing 6, constitutes a ring race 15, which is cylindrical and which is disposed about a horizontal axis, preferably, coincident with the axis of shaft 10. In Figs. 3, 4 and 5, I have shown a seed releasing ring A disposed in said race and in the last named figure, the ring A is connected in driven relation with said disc 12 by means such as a pin and socket connection, as generally indicated at 16, so that when the ring is slipped into position from the open side of casing 6, with the socket in registry with the pin, the connection is automatically made. The seed releasing rings will be later described in detail. I have shown ring A broken away at the left of Fig. 4, to clearly designate the ring race 15.

Reference will next be made to the means for maintaining the seed releasing ring in position and also in the desired tension adjustment.

A combined retaining and tension ring is indicated at 17 (Figs. 7 and 8) and the same is chamfered or cammed at 18 at diagrammatically opposite points. Wing headed screws 19 are threaded into flange 8 and have conical ends 20, for engagement with the cammed portions 18 so that any desired tension against the outer face of ring A, may be obtained, and whereby the ring A will in any event be held against the disc 12 to maintain a driving connection. I recess flange 8, to accommodate ring 17 so that the latter will be disposed slightly inside the outer face of flange 8, as shown in Fig. 8. Further, I may slightly recess the flange 8, as shown at 21, to afford leeway for adjusting ring A to different positions of tension. It will be noted that the ring 17 cannot revolve when secured in position because of the frictional engagement of screws 19 and also because the recesses 18 provide convenient shoulders 22.

By reference to Figs. 4 and 5, it will now be clear that the imperforate disc 12 and the rings A and 17, fit so snugly that no chaff can gain entrance between or behind either thereof. It will also be clear that if too much tension was applied to ring 17, wheel 1, could not turn or there would be an objectionable drag on the planter. Hence, it is important to give ring 17 just enough tension to make the snugly fitted parts to run smoothly and still fit tightly.

The seed casing 6 is provided with a seed discharge opening, as shown in Fig. 4, and which is preferably elongated, the lower terminal being indicated at 23 and the upper terminal at 24. This opening, which I will generally indicate at B, is sufficiently wide to register with any size opening or aperture in the seed releasing rings, to be later described, and it will be noted that this discharge opening B intersects the ring race 15, peripherally thereof. An important feature of this opening is that its lower terminal 23 is located rearwardly of the lower center of race 15, with respect to the direction of travel of the planter, which is to the left of Fig. 4, and it is also located upwardly from the lower center of said race 15, which lower center I will designate at C. Thus, when the planter is not being advanced, the seed cannot flow through and be wasted. Further, the opening B is elongated to such an extent as to afford plenty of time for a seed to pass through the ring A, and not be sliced by the upper margin 24, of said opening. This slicing of seed is very objectionable as its fragments work in between the revolving parts and cause friction.

Depending from the casing 6, in registry with discharge opening B, is a tube 25 that conveys the released seeds to a shoe 26, secured to said tube, and which may be of the usual construction.

An angle or saddle plate is shown having one section 27, secured to wall 7 of casing 6, as shown in Fig. 6, and another section 28 adapted to be secured to yoke 3, as shown in Fig. 3, the yoke 3 having a section 29 which may be bent up and secured to section 27, if desired. At any rate, the intermediate frame structure between wheels 1 and 2, consists of yoke 3, saddle 28 and casing 6, and this rigidly connected structure is journalled rotatively on wheels 1 and 2 so that it can be tilted thereon, as will now be clear.

Reference will next be made to the novel means for supplying the casing 6 with seed.

A supply means is provided which is preferably in the form of a hopper having a back wall 30, end walls 31 and an inclined front wall 32. A hinged lid 33, is provided for closing the top of said hopper. The rear wall 30, as shown in Fig. 2, extends laterally of the hopper and is suitably notched at 34, to permit anchoring screws 35, threaded into flange 8, to impinge said wall and hold the hopper against the open side of seed casing 6, to close the latter, as shown in Figs. 3 and 5. The rear wall 30 is provided with a seed delivery opening 36 for delivery of seed by gravity from the hopper into casing 6. In order to regulate the extent of such delivery and thereby control or determine the depth of seed in casing 6, I provide means which will next be described.

As shown, such means may take the form of a plate 37 that may be frictionally held tightly by guides 38, so that the plate may be moved up or down by ledge 39 to cause the lower edge 40 to limit flow of seed and hence limit the depth of seed in the casing 6. By thus limiting the level of seed in casing 6, the apertures in rings A cannot afford free flow and waste of seed through opening B, when the planter is standing still. Further, a shallow depth of seed in the casing is highly desirable as the discharge into the ring apertures is greatly facilitated, as will later appear.

Reference will next be made to the improved seed releasing rings.

It is contemplated that each planter will be supplied with a series of rings A all of the same outer diameter so that all will fit the ring race 15 snugly and all of the rings will have a socket in a position for engagement with the pin in disc 12, designated by 16. Further, all of said rings will be of the same width so as to come within the range of the tension ring 17. A further characteristic of all the rings, in the most preferred construction, is that in addition to the periphery 41 being the same, the inner face of each ring will preferably incline radially outwardly from the side edges 42, to the center, as indicated in Fig. 14, at 43. Thus the seed carried by the inner face of the ring will, in addition to gravity, have a tendency to move toward the center of the ring.

Referring to Figs. 9 to 13, I have shown a series of seed releasing rings in developed plan and longitudinal section. The ring D, has a single seed releasing opening 44 and this ring would be employed when the planter is used to drop seed in hills, and the ring D would make one revolution before the aperture 44 reached discharge opening B. It will be understood that the seed releasing ring will always and in any event be rotated at the same speed as wheel 1. If seed were to be planted in rows, or drilled in rows, then a ring like E would be used in which there is a plurality of releasing apertures 45, of relatively small size. Ring F, is provided with apertures 46, of relatively larger size and less in number than with ring E. It will now be seen that any range of ring capacity adapted for various seeds may be provided, within the purview of this invention, in view of the above disclosure.

In addition to the foregoing, it is a feature of this invention to provide seed releasing apertures of a novel form for the performance of a new function.

In most cases, it is desirable to discharge more than a single seed at each dropping, especially when operating with small size seed and it is essential to avoid waste by not discharging too many or more than necessary, and in a gravity device, this problem necessitates a solution entirely different from other types of machines, especially when there is added to the foregoing, the desirability of discharging seed in uniform quantities.

Therefore, while a simple form of aperture is within the province of this invention, still, it is a very special feature thereof to provide what I will term accumulative or reservoir apertures wherein a plurality of seeds can be released from the casing into the ring A and segregated or held until the moment of final discharge.

One way of accomplishing this function is to provide releasing apertures which are coned, and in the drawings I have shown all the apertures tapered as most clearly illustrated in Fig. 12, in connection with aperture 44, in which the inner face of ring D, is indicated at 47 and the outer face at 48. Thus it will be seen that aperture 44 is coned or tapers from the discharge terminal 49 to the intake terminal 50, the latter being the smallest. Hence the apertures converge radially inwardly of the ring. Now it will be clear that seed can enter the aperture at C, in Fig. 4, until the reservoir is completely filled, and these seed will be held in the aperture until the latter is advanced to the discharge opening B. This applies to large, as well as small seed. It will also be clear that if the seed level in the casing is at G, in Fig. 4, the aperture will not discharge until it reaches an elevation above the seed level so that it cannot again re-fill. Thus, seed is released subjacent the mass and discharged above the mass.

Another feature of the invention resides in making rings of different thickness to handle seed of different character, which will next be explained.

For instance, cucumber seed is an elongated seed much the shape of oats and of course if the entrance to the releasing aperture was merely equal to the transverse diameter of such seed, the latter could not enter the aperture unless it entered endwise. Therefore, it is necessary to make the entrance large enough to admit this small type of seed when the latter is lying flat, and hence the diameter of the entrance must be equal to the length of the seed. For such seed, I use a relatively thin ring, as indicated at F in Fig. 13, because I do not want the reservoir as proportionately large as with a spherical seed and therefore it is necessary not to have such a depth of reservoir in order to accommodate the required number of seed. In this manner, I am enabled to deal with a seed such as a cucumber seed, for instance, and still retain the gravity feature.

For peas beans and corn, I use a thicker releasing ring with correspondingly larger size apertures, the ring being thick enough so that two or more seed can be accommodated by the reservoir.

In any event, it will be seen that the seed releasing ring A is upright or vertically disposed and that it rotates about a substantially horizontal axis and the seed is delivered to the ring and maintained at a relatively shallow depth. Thus, as the ring rotates, it continually supports the seed mass on its lower inner face, and the mass is rolled as the ring rotates and is maintained in constant motion to thereby facilitate entrance of the subjacent seed from the mass into the apertures.

It will also be seen that these rings are in the form of circular bands of material and that the seed releasing apertures are disposed between the lateral side edges of these ring bands thereby affording intermediate and lateral surface imperforate portions to support the loose mass of seed.

A handle bar 51, is shown rigidly secured to a metal strap 52, which is anchored to casing 6, as shown in Fig. 6. On the outer end of said handle bar 51, I provide hand grip bars 53 extending transversely therefrom. Braces 54 are anchored at 55 to handle bar 51 and at 56, to the outer ends of hand grip bars 53.

A cover roller 57, preferably having a convex periphery, is rotatively mounted at 58, on arm 59, which is pivoted to casing 6, at 60. A U-shaped strap 61, mounted on bar 52, limits downward movement of roller 57. The function of roller 57 is to cover the furrow formed by the shoe 26.

Reference will next be made to an improved marker with which the device of my invention is shown equipped.

My improved marker includes a U-shaped marker carrying rod having a bight portion or section 62 disposed lengthwise of handle bar 51, and having a marker carrying limb 63 and a handle limb 64. Screw eyes 65 and 66 pivotally support said rod on handle bar 51 against movement lengthwise thereof and so that said rod can be shifted from one position to another. The handle limb 64 is diposed in a manner to engage brace bars 54 to limit movement of the rod in either direction. A marker stem 67 carries a marker which is shown in the form of a diamond shaped plate having oppositely disposed apices 68 and 69, either of which will enter the soil and mark the same for the next row, dependent upon whether the marker plate is on the right or left side of the handle bar 51. It is understood that when the end of a row is reached and the planter is turned around, the marker must be shifted so that it will always be on the "land side" or in other words, on that side in advance of the rows to be planted.

The marker stem 67 may be provided with an eye 70 rotatively mounted on a sleeve on limb 63. Said sleeve may consist of enlarged portions 71 and an intermediate reduced portion 72 about which latter eye 70 is disposed. Set screws or like means 73 may have threaded engagement in portions 71 and engage limb 63 to secure the sleeve in the desired rotative position, and also in a longitudinal position with respect to the graduations on limb 63 to mark the rows the desired distance apart. Stop or limiting bails, each composed of U-shaped wire and indicated at 74 and 75, are secured to the portions 71 not only to limit depth movement of the marker plate into the soil, but also to lift the marker stem when the carrying rod is being reversed and dispose the stem in a position to descend by gravity into engagement with the soil when the rod is reversed. Thus, it is not necessary for the operator to stop and stoop down and adjust the marker by hand and it is only necessary to shift the marker by changing the position of handle limb 64, as will now be clear.

While the operation of the device may be clear from the foregoing description, it will be briefly recapitulated as follows:

First, the proper ring A is selected for the type of seed to be drilled or dropped and the screws 19 are turned home to afford the right tension. The hopper is then disposed in position and anchored by set screws 35, whereby the open side of casing 6 will then be closed. The plate 37 will next be adjusted to determine the depth of seed desired in casing 6, it being understood that small seed can be successfully used at a more shallow depth than large seed, in most instances. The hopper will then be filled and after the marker has been properly positioned, the operator may advance the planter on its work.

The seed will instantly flow from the hopper into the casing 6, by gravity, to the depth permitted by the lower edge 40, of plate 37, if the latter is a part of the equipment, and if not, the upper edge of opening 36 in wall 30, will function as a depth limiting edge. In any event, it will be seen that the seed is delivered laterally into the casing and upon the lower inner face of ring A.

As the planter is advanced, the disc 12 will rotate ring A, and the seed will thus be advanced rearwardly with respect to the direction of movement of the planter, and as the ring A seeks to carry the seed with it, the seed will seek a normal level by gravity and this will result in a rolling motion of the seed that greatly facilitates entrance of the seed into the apertures. Thus, seed subjacent the mass will enter the lowermost aperture near C, and fill the reservoir thereof whereby clogging is made impossible, and whereby each aperture may accommodate a plurality of seeds. This segregated quantity of seed released into the ring A, is not immediately discharged but is advanced or elevated into registry with discharge opening B, at which point it is above the seed level, and then it is free to descend by gravity into tube 25, that delivers to shoe 26. The covering roller 57, following shoe 26, or any like means, will serve to cover the seed, as will now be understood.

It is believed that the method and apparatus of my invention will be clear from the foregoing description, and while I have herein shown and described one specific form thereof, I do not wish to be limited thereto except for such limitations as the claims may import.

I claim:—

1. In a planter, a seed casing having an interior ring race disposed about a substantially horizontal axis and provided with a peripherally disposed seed discharge opening intersecting said race, and a driven seed releasing ring rotatable in said race and adapted to receive and support the seed in said casing and having one or more seed releasing apertures adapted to register with said discharge opening for passage of seed through said ring and outwardly through said casing.

2. In a planter, a seed casing having an interior ring race disposed about a substantially horizontal axis and provided with a peripherally disposed seed discharge opening intersecting said race above the lower portion thereof, a driven seed releasing ring rotatable in said race and having a series of seed releasing apertures extending radially therethrough and adapted to register with said seed discharge opening successively as said ring is rotatably advanced, and means for delivering seed to said casing laterally of and onto said ring to a predetermined depth in said casing.

3. In a planter, a seed casing having an open side and provided with an interior ring race disposed about a substantially horizontal axis and having a seed discharge opening intersecting said race, a driven seed releasing ring rotatable in said race and having a series of seed releasing apertures extending radially through said ring for registry with said discharge opening successively as said ring is rotatively advanced, a hopper having a rear wall adapted to close the open side of said casing and said rear wall being provided with a discharge opening for delivery of seed into said casing and upon the lower interior face of said ring.

4. In a planter, a seed casing having an open side and provided with an interior ring race disposed about a substantially horizontal axis and having an elongated seed discharge opening intersecting said race and extending from above the lowermost portion of said race upwardly in a direction rearwardly with respect to the direction of travel of said planter, a driven seed releasing ring rotatable in said race and having a series of seed releasing apertures extending radially therethrough for successive registry with said elongated discharge opening as said ring is rotatively advanced, and a hopper secured to said casing and having a rear wall closing the open side of said casing and provided with a discharge opening for delivery of seed into said casing and upon the lower interior face of said ring, and a slide movable abreast of the opening in said rear wall for regulating the depth of seed delivered into said casing.

5. In a planter, a horizontally disposed rotatively driven shaft, a seed casing rotatably journalled on said shaft and having an open side and a side wall, a ring driving disc abreast of said side wall and non-rotatively connected with said shaft to be driven thereby, said casing having an interior ring race disposed about the horizontal axis of said shaft and provided with a seed discharge opening intersecting said race, a seed releasing ring rotatable in said race and connected to be driven by said disc and having a series of radially disposed seed releasing apertures extending through said ring and adapted to successively register with said discharge opening, and a hopper closing the open side of said casing and having an opening for delivery of seed into said casing and upon the interior lower face of said ring, and a handle connected with said casing.

6. In a planter, a horizontally disposed rotatively driven shaft, a seed casing rotatably journalled on said shaft and having an open side and a side wall, a ring driving disc abreast of the inside face of said side wall and fixed to said shaft to be driven thereby, said casing having an interior ring race disposed about a horizontal axis and provided with a seed discharge opening intersecting said race, a seed releasing ring rotatable in said race and fitting against and being connected with said disc to be driven thereby and said ring having a series of radially disposed seed releasing apertures extending therethrough for successive registry with said discharge opening, a hopper closing the open side of said casing and delivering seed thereto, and a retaining ring connected with said casing and holding said seed releasing ring against and in operative relation to said disc.

7. In a planter, a seed casing having a ring race disposed about a horizontal axis and having a seed discharge opening intersecting said race, a plurality of seed releasing rings of different thickness for selective insertion into said race and each ring having seed releasing apertures extending radially therethrough of different size and spacing with respect to the other rings to accommodate different seed and for either drilling rows or planting hills, means for rotatably advancing a ring in said casing, and means for delivering seed to said casing upon the lower inner face of said ring.

8. As a new and useful article of manufacture for a planter as described, a seed releasing ring band provided with one or more seed releasing apertures extending radially therethrough between the lateral edges of said ring band.

9. As a new and useful article of manufacture for a planter as described, a seed releasing and supporting ring band provided with one or more seed releasing apertures extending radially therethrough, and said apertures being coned radially inwardly of said ring.

10. As a new and useful article of manufacture for a planter as described, a seed releasing ring provided with one or more seed releasing apertures extending radially therethrough and enlarged radially outwardly from relatively small intake to relatively large outlet terminals, and the radially inner seed supporting face of said ring being inclined from the side edges inwardly toward said apertures.

PHILIP S. PALMER.